Feb. 6, 1951 J. D. COCHIN 2,540,428
VEHICLE AXLE SUPPORT
Filed Feb. 11, 1949 2 Sheets-Sheet 1
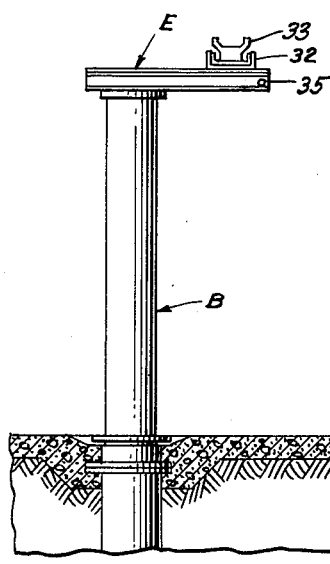
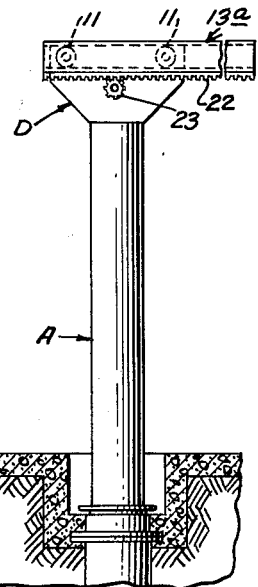
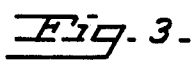
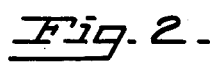
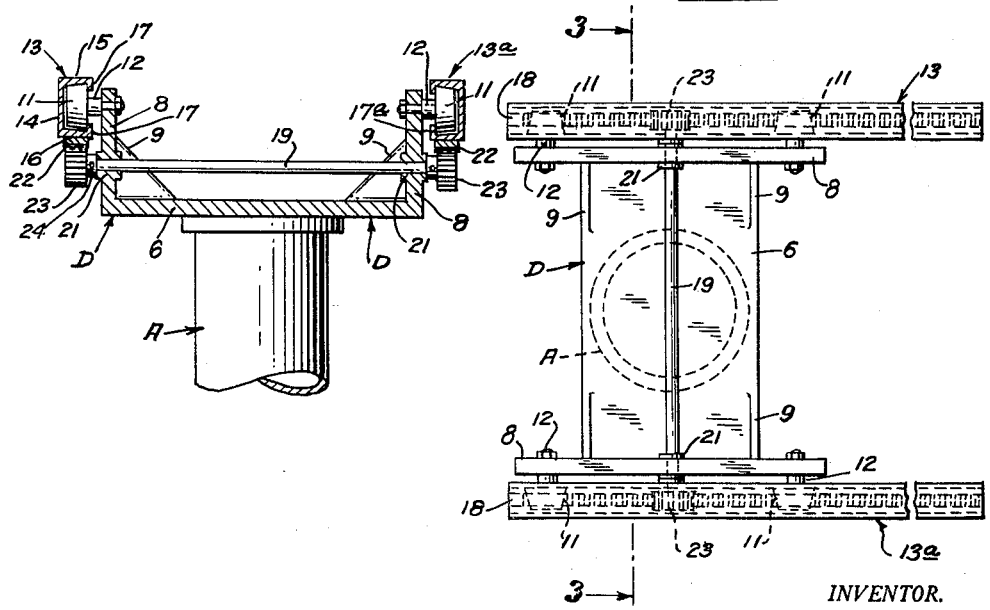
INVENTOR.
JOHN D. COCHIN
BY Stephen S. Townsend
ATTORNEY Feb. 6, 1951 J. D. COCHIN 2,540,428
VEHICLE AXLE SUPPORT
Filed Feb. 11, 1949 2 Sheets-Sheet 2
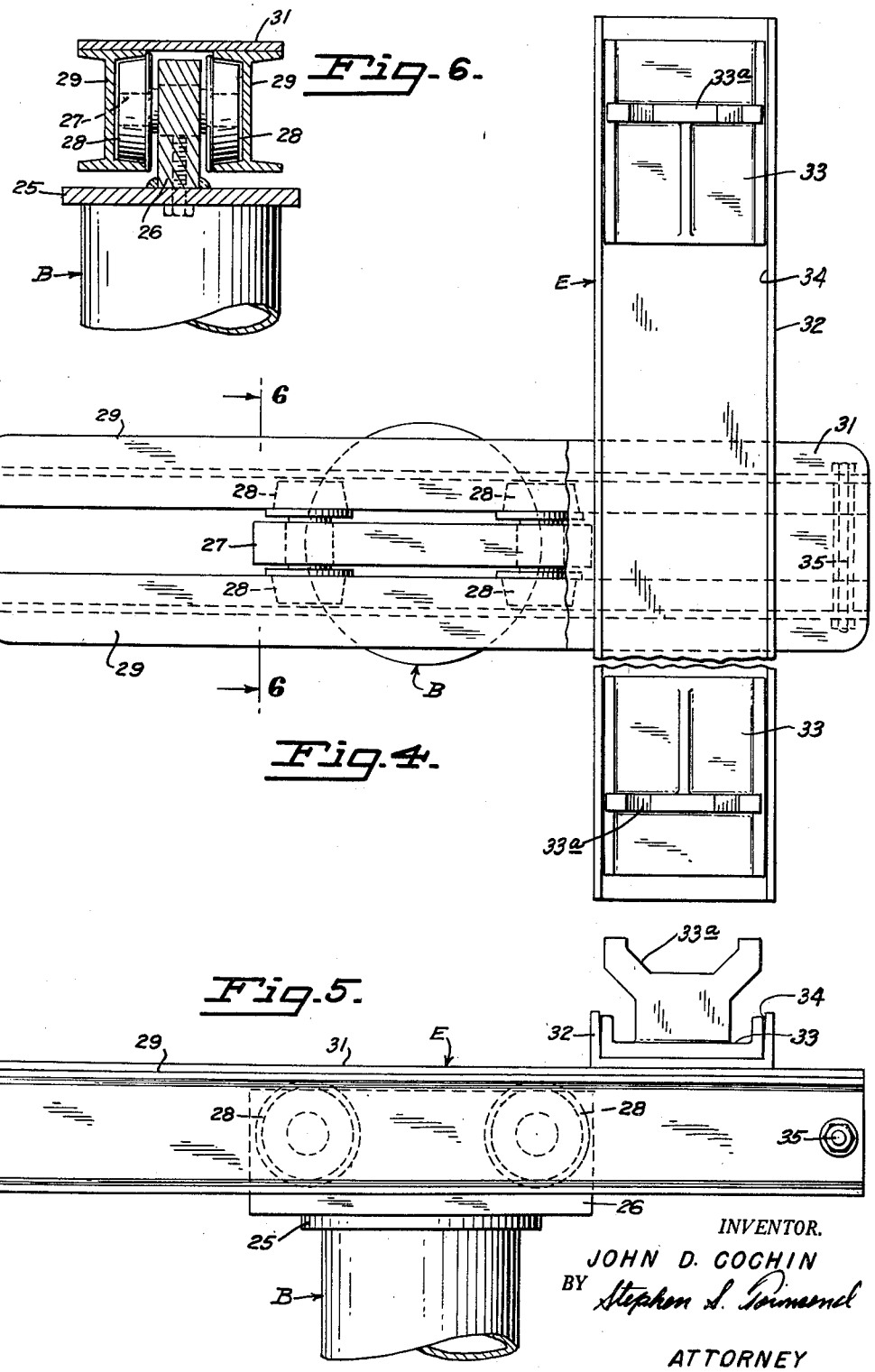
INVENTOR.
JOHN D. COCHIN
BY
ATTORNEY Patented Feb. 6, 1951

2,540,428

UNITED STATES PATENT OFFICE 2,540,428

VEHICLE AXLE SUPPORT

John D. Cochin, San Francisco, Calif.

Application February 11, 1949, Serial No. 75,892

7 Claims. (Cl. 254—89)

This invention relates to an improved vehicle axle support or rack and more particularly relates to a vehicle axle support which is especially suited for use in association with dual hydraulic ram-type automobile and truck lift installations of the type which are frequently installed in garages and service stations and the like.

The particular embodiment of my invention, which is illustrated in the drawings and which will be described in greater detail hereinafter, comprises generally a base plate bolted or welded to the top of a ram-type lift, and a plurality of rollers supported on either side of the base plate to support slidably thereon axle engaging members.

It has become an increasingly frequent practice of garage and service station operators to employ, in lieu of the more conventional single standard hydraulic vehicle lift, dual lifts which are arranged to support respectively the front and rear axles of a vehicle. A peculiar advantage in employing dual lifts instead of the single standard type lift is that a mechanic or repairman is enabled to elevate one end of a supported vehicle higher than the other end to permit easier and more convenient access to a particular working area or part located on the bottom or underpart of a supported vehicle. It has been proposed in the past to provide dual ram-type lifts with spaced pairs of horizontally disposed and substantially parallel elongated axle engaging bars or racks to engage and support opposite ends of the front and rear vehicle axles. It has been found, however, that due to widely varying wheel base lengths of different type motor vehicles that these elongated axle engaging members must have a sufficient length to accommodate vehicles which may vary one from the other in wheel base length up to four or five feet.

A principal object, therefore, of the present invention is to provide a novel axle engaging member which may be made considerably shorter than the more conventional elongated rack or bar, hereinabove mentioned, and which said novel axle engaging member, because of its slidable mounting, may be moved in a direction appropriate to accommodate vehicles having varying wheel base lengths. A particular advantage of my invention is that because of the relatively shorter lengths of the axle supports, unobstructed access may be had to larger areas on the underpart of a supported vehicle to facilitate the repair or replacement of parts thereon.

Another object of the present invention is to make the axle engaging members of a vehicle lift adjustable slidably in a direction transverse to the longitudinal axis of a supported vehicle axle in order that the said axle engaging members may be moved forwardly or rearwardly with respect to the vehicle and the axle depending on whether the area on the underside of the car to be exposed and made accessible for servicing or repairs is located forwardly or rearwardly of the supported vehicle axle.

Other objects of the present invention are to provide a vehicle axle support which is rugged in construction and which is relatively simple and inexpensive to manufacture.

Further objects of the present invention will become apparent upon reading the following specification and referring to the accompanying drawings in which similar characters of reference represent corresponding parts in each of the several views.

In the drawings:

Fig. 1 is a side elevational view of a pair of dual hydraulic ram-type automobile vehicle lifts showing the present invention in operative association therewith.

Fig. 2 is a plan view of the present invention.

Fig. 3 is a view in section of the invention taken on line 3—3 of Fig. 2.

Fig. 4 is a plan view of a modification of the present invention.

Fig. 5 is a side elevational view of the modification of the invention.

Fig. 6 is a view in section taken along line 6—6 of Fig. 4.

Referring particularly to Fig. 1 in the drawings, there is illustrated a more or less conventional installation of dual hydraulic ram-type vehicle lifts comprising a rear lift A and a front lift B which are shown elevated to different heights with respect to the ground or floor C. The present invention which comprises a vehicle axle rack or supporting device is indicated generally at D in the drawings and is shown as being operatively positioned on top of the ram of rear lift A. Positioned on top of the ram of front lift B is a vehicle axle rack or supporting device indicated generally at E which is in the nature of a modification of the axle support D.

An axle support or rack of the type indicated generally at D in the drawings comprises more specifically a base plate 6 attached suitably as by welding or the like to the top of the ram of lift A and a pair of side members 8 which extend upwardly from the base plate. Triangular-shaped reinforcing members 9 are preferably provided to add structural strength to the side mem-

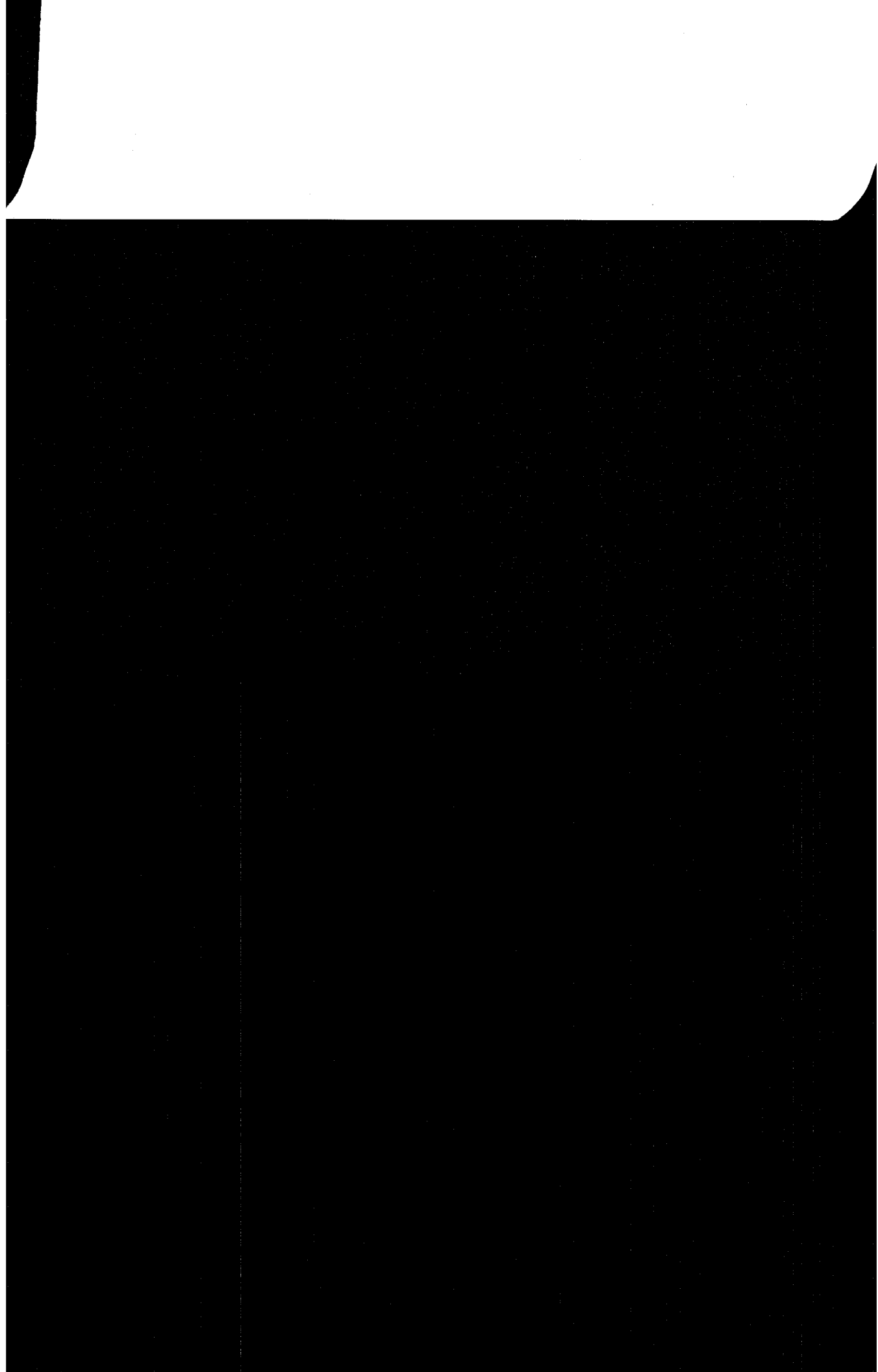

from one another to accommodate vehicles of various wheel base lengths. Moreover, because both the front and rear axle supports are adjustably movable in the direction of the length of a vehicle to be supported, it is possible to reduce the overall length of the axle supports themselves which permits larger areas of the underpart of a supported vehicle to be left accessible for purposes of repair or servicing. In addition, by making the axle supports relatively short in length a saving in materials out of which the devices are made is also effected with resultant advantage in that manufacturing costs are considerably reduced or minimized.

Although I have described my invention in some detail by way of illustration and example for purposes of clarity of understanding, it is understood that certain changes and modifications may be made within the spirit of the invention and scope of the appended claims.

I claim:

1. An axle support comprising a base, and an elongated horizontally disposed axle supporting rail mounted movably on said base for movement in the direction of the longitudinal axis of said rail and in a direction transverse to the longitudinal axis of a vehicle axle adapted to be supported by said rail.

2. An axle support comprising a base, a first axle engaging member comprising an elongated horizontally disposed rail to support a vehicle axle adjacent one end thereof, said first axle engaging member mounted movably on said base for movement in the direction of the longitudinal axis of said member and in a direction transverse to the longitudinal axis of a said vehicle axle adapted to be supported thereby, and a second axle engaging member comprising a rail disposed parallel to and spaced from said first member to support the other end of a said vehicle axle, said second axle engaging member mounted movably on said base for movement in the direction of the longitudinal axis of said second member and in a direction transverse to the longitudinal axis of a vehicle axle adapted to be supported thereby.

3. An axle support according to claim 2 wherein there is provided a connecting member connecting said first and second axle engaging members together whereby slidable movement of one of said members will cause the other of said members to move correspondingly.

4. An axle support comprising a base, first and second side members extending upwardly from said base, a plurality of rollers having their respective axes of rotation disposed substantially horizontally provided on each of said side members, a first axle supporting member comprising an elongated rail to support one end of a vehicle axle, said first axle engaging member mounted slidably on the rollers provided on said first side member and arranged for movement in the direction of the longitudinal axis of said member and in a direction transverse to the longitudinal axis of a said vehicle axle adapted to be supported thereby, and a second axle engaging member constructed similarly to said first axle engaging member to support the other end of a said vehicle axle adapted to be supported thereby, said second axle engaging member mounted slidably on the rollers provided on said second side member and arranged for movement in the direction of the longitudinal axis of said second member and in a direction substantially paralleling the direction of movement of said first axle engaging member.

5. A vehicle axle support according to claim 4 wherein a connecting member is provided connecting said first axle engaging member with said second axle engaging member whereby movement of one of said members will cause the other of said members to move correspondingly.

6. A vehicle axle support according to claim 4 wherein there is provided a rack on each of said first and second axle engaging members, a shaft journalled adjacent its opposite ends to said first and second side members, and a pair of pinions mounted adjacent opposite ends of said shaft to mesh respectively with each said rack whereby movement of one of said axle engaging members will cause the other of said axle engaging members to move correspondingly.

7. An axle support comprising a base plate, a plurality of rollers having their respective axes of rotation disposed substantially horizontal extending outwardly from both sides of said base plate, a pair of spaced parallel connected I-beams, each of said I-beams mounted slidably on the rollers extending outwardly from one side of said base plate, a cross-beam extending across the top of said pair of connected I-beams, a trackway provided in said cross-beam extending lengthwise thereof, and a pair of axle engaging members adapted to support a vehicle axle adjacent its opposite ends mounted slidably in said trackway for movement toward and away from one another, said I-beams arranged to move slidably over their respective rollers in the direction of their longitudinal axes and in a direction transverse to the longitudinal axis of a said vehicle axle adapted to be supported by said axle engaging members.

JOHN D. COCHIN.

REFERENCES CITED

The following references are of record in the file of this patent:

UNITED STATES PATENTS

| Number | Name | Date |
| --- | --- | --- |
| 2,443,405 | Thompson | June 15, 1948 |

FOREIGN PATENTS

| Number | Country | Date |
| --- | --- | --- |
| 102,479 | Australia | Nov. 25, 1937 |